(12) United States Patent
Long et al.

(10) Patent No.: US 10,127,471 B2
(45) Date of Patent: Nov. 13, 2018

(54) METHOD, DEVICE, AND COMPUTER-READABLE STORAGE MEDIUM FOR AREA EXTRACTION

(71) Applicant: Xiaomi Inc., Beijing (CN)

(72) Inventors: Fei Long, Beijing (CN); Tao Zhang, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 141 days.

(21) Appl. No.: 15/298,352

(22) Filed: Oct. 20, 2016

(65) Prior Publication Data

US 2017/0124718 A1 May 4, 2017

(30) Foreign Application Priority Data

Oct. 30, 2015 (CN) .......................... 2015 1 0726272

(51) Int. Cl.
| | |
|---|---|
| *G06K 9/00* | (2006.01) |
| *G06K 9/46* | (2006.01) |
| *G06K 9/20* | (2006.01) |
| *G06K 9/34* | (2006.01) |
| *G06T 7/00* | (2017.01) |

(52) U.S. Cl.
CPC ....... *G06K 9/4604* (2013.01); *G06K 9/00442* (2013.01); *G06K 9/00449* (2013.01); *G06K 9/2054* (2013.01); *G06K 9/34* (2013.01); *G06K 9/4647* (2013.01); *G06T 7/0081* (2013.01)

(58) Field of Classification Search
CPC .... G06K 9/00442; G06K 9/4604; G06K 9/46; G06T 2207/10004; G06T 5/40
See application file for complete search history.

(56) References Cited

U.S. PATENT DOCUMENTS

| | | | |
|---|---|---|---|
| 8,315,462 | B2 | 11/2012 | Nakamura |
| 9,158,986 | B2 | 10/2015 | Nakamura |
| 2003/0174907 | A1 * | 9/2003 | Kanemoto et al. ........... 382/309 |
| 2011/0255795 | A1 | 10/2011 | Nakamura |
| 2014/0219561 | A1 | 8/2014 | Nakamura |

FOREIGN PATENT DOCUMENTS

| | | |
|---|---|---|
| CN | 101561876 A | 10/2009 |
| CN | 102222241 A | 10/2011 |
| CN | 102955941 A | 3/2013 |
| CN | 103488984 A | 1/2014 |
| CN | 104408450 A | 3/2015 |
| CN | 104573616 A | 4/2015 |

(Continued)

OTHER PUBLICATIONS

International Search Report in International Application No. PCT/CN2015/099298, issued by the State Intellectual Property Office of the P.R. China as ISA, dated Aug. 2, 2016 (11 pages).

(Continued)

*Primary Examiner* — Phuoc Tran
(74) *Attorney, Agent, or Firm* — Finnegan, Henderson, Farabow, Garrett & Dunner LLP

(57) ABSTRACT

A method for area extraction includes obtaining an area position of a first information area in a document image, determining a second information area according to the area position of the first information area, and segmenting the second information area to obtain at least one character zone.

9 Claims, 16 Drawing Sheets

(56) References Cited

FOREIGN PATENT DOCUMENTS

| JP | 2010-231541 A | 10/2010 |
|---|---|---|
| JP | 2011-227636 A | 11/2011 |
| JP | 2014-164622 A | 9/2014 |
| KR | 10-1295000 B1 | 8/2013 |
| KR | 10-2015-0047060 A | 5/2015 |
| RU | 2329535 C2 | 7/2008 |

OTHER PUBLICATIONS

Office Action issued in Russian Patent Application No. 2016110818/08 (017070), dated May 22, 2017.
Office Action for Korean Application No. 10-2016-7005538, mailed from the Korean Intellectual Office dated Feb. 27, 2017.
Extended European Search Report of European Patent Application No. 16195231.2, from the European Patent Office, dated Mar. 8, 2017.
Yanyun Cheng et al., "ID Numbers Recognition by Local Similarity Voting," dated Oct. 10, 2010, 2010 IEEE International Conference on Systems MAN and Cybernetics (SMC), pp. 3881-88, Piscataway, NJ, USA, XP031805716, DOI: 10.1109/ICSMC.2010.5641766, ISBN: 978-1-4244-6586-6.

* cited by examiner

__(1)__

METHOD, DEVICE, AND COMPUTER-READABLE STORAGE MEDIUM FOR AREA EXTRACTION

CROSS-REFERENCE TO RELATED APPLICATION

This application is based on and claims priority to Chinese Patent Application No. 201510726272.4, filed Oct. 30, 2015, the entire contents of which are incorporated herein by reference.

FIELD

The present disclosure generally relates to image processing and, more particularly, to a method, device, and computer-readable storage medium for area extraction.

BACKGROUND

Identity (ID) card automatic identification refers to a technology for recognizing characters (text) on an ID card by image processing.

In conventional technologies, to automatically recognize an ID card, the ID card is scanned by an ID card scanning device in a fixed relative position to obtain a scanned image of the ID card. Character recognition is performed on several areas in the scanned image to obtain information about at least one of name, gender, nationality, date of birth, address, or ID number. However, if the image is not obtained by the ID card scanning device but, for example, directly by photographing, it is difficult to identify the image of the ID card.

SUMMARY

In accordance with the present disclosure, there is provided a method for area extraction including obtaining an area position of a first information area in a document image, determining a second information area according to the area position of the first information area, and segmenting the second information area to obtain at least one character zone.

Also in accordance with the present disclosure, there is provided a device for area extraction including a processor and a memory storing instructions that, when executed by the processor, cause the processor to obtain an area position of a first information area in a document image, determine a second information area according to the area position of the first information area, and segment the second information area to obtain at least one character zone.

Also in accordance with the present disclosure, there is provided a non-transitory computer-readable storage medium having stored therein instructions that, when executed by a processor, cause the processor to obtain an area position of a first information area in a document image, determine a second information area according to the area position of the first information area, and segment the second information area to obtain at least one character zone.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of device and methods consistent with aspects related to the invention as recited in the appended claims.

Methods consistent with the present disclosure can be implemented, for example, in a terminal.

Figure 1:
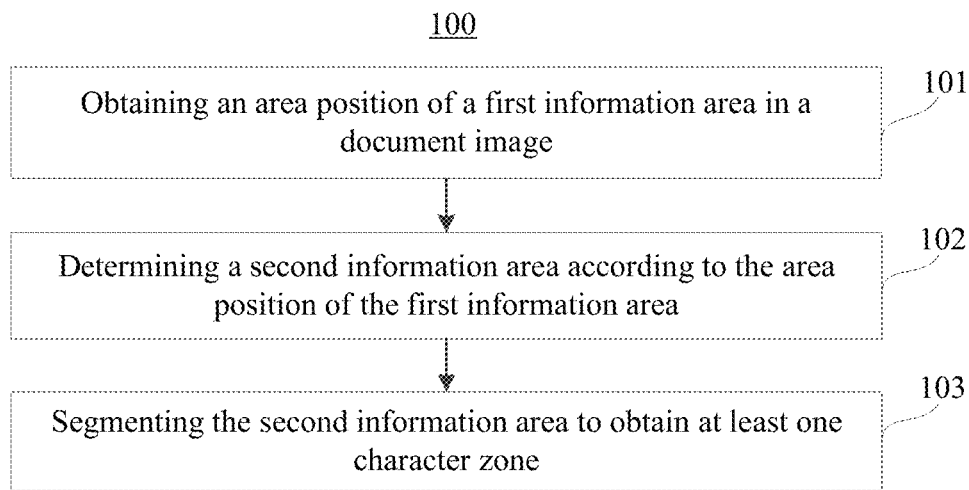
FIG. 1 is a flow chart showing a method for area extraction according to an exemplary embodiment.

FIG. 1 is a flow chart showing a method 100 for area extraction according to an exemplary embodiment. As illustrated in FIG. 1, at 101, an area position of a first information area in a document image is obtained. The document image is an image obtained directly by photographing the document, such as an image of an identity (ID) card, an image of a social security card, or the like. An information area refers to an area in the document image that contains characters, such as at least one of a name area, a date of birth area, a gender area, an address area, an ID number area, a serial number area, an issuing office area, an expiration date area, or the like. At 102, a second information area is determined according to the area position of the first information area. In some embodiments, the position of the second information area is more difficult to obtain than the position of the first information area. At 103, the second information area is segmented to obtain at least one character zone.

Figure 2A:
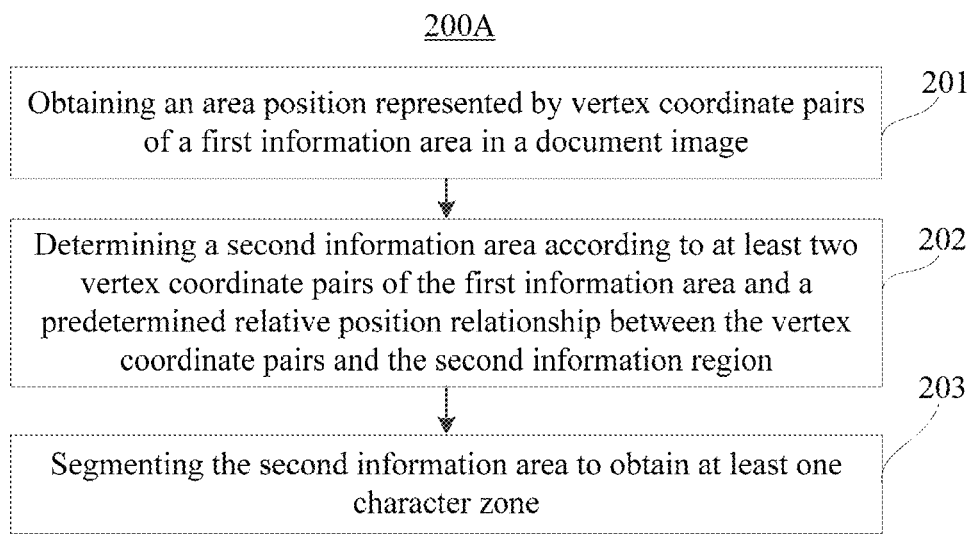
FIG. 2A is a flow chart showing a method for area extraction according to another exemplary embodiment.

FIG. 2A is a flow chart showing a method 200A for area extraction according to another exemplary embodiment. As illustrated in FIG. 2A, at 201, an area position of a first information area in a document image is obtained. In some embodiments, the information area includes a plurality of vertexes, each of which can correspond to a pair of two coordinates defined in a coordinate system, such as a Cartesian coordinate system. Hereinafter, a pair of coordinates of a vertex is also referred to as a vertex coordinate pair. The area position can be represented by vertex coordinate pairs of the first information area. As noted above, the document image is an image obtained by directly photographing the document, and can be, for example, an ID card image, a social security card image, etc. In some embodiments, a rectangular region for guiding the photographing is set in a photographing interface. A user can align the rectangular region with the document when photographing the document.

The vertex coordinate pairs of the vertexes of the first information area can be obtained according to the area position of the first information area. For example, a Cartesian coordinate system can be established using the upper left corner of the document image as the origin, the upper edge of the document image as the positive half of the horizontal coordinate axis, i.e., the x-axis, and the left edge of the document image as the positive half of the vertical coordinate axis, i.e., the y-axis. The vertex coordinate pairs of the vertexes of the first information area are obtained according to positions of respective vertexes in the Cartesian coordinate system, and the region position of the first information area is represented by the vertex coordinate pairs.

At 202, a second information area is determined according to at least two vertex coordinate pairs of the first information area and a predetermined relative position relationship between the vertex coordinate pairs and the second information area. In some embodiments, the predetermined relative region relationship can be a relative position between the vertex coordinate pair of the first information area and the upper edge, the lower edge, the left edge, and the right edge of the second information area.

For example, the first information area includes four vertexes, and any two of the four vertex coordinate pairs can be used to determine the second information area. Generally, the larger the distance between the two vertex coordinate pairs is, the smaller the error in determining the second information area is.

At 203, the second information area is segmented to obtain at least one character zone. A character zone is an image zone including a single character.

Figure 2B:
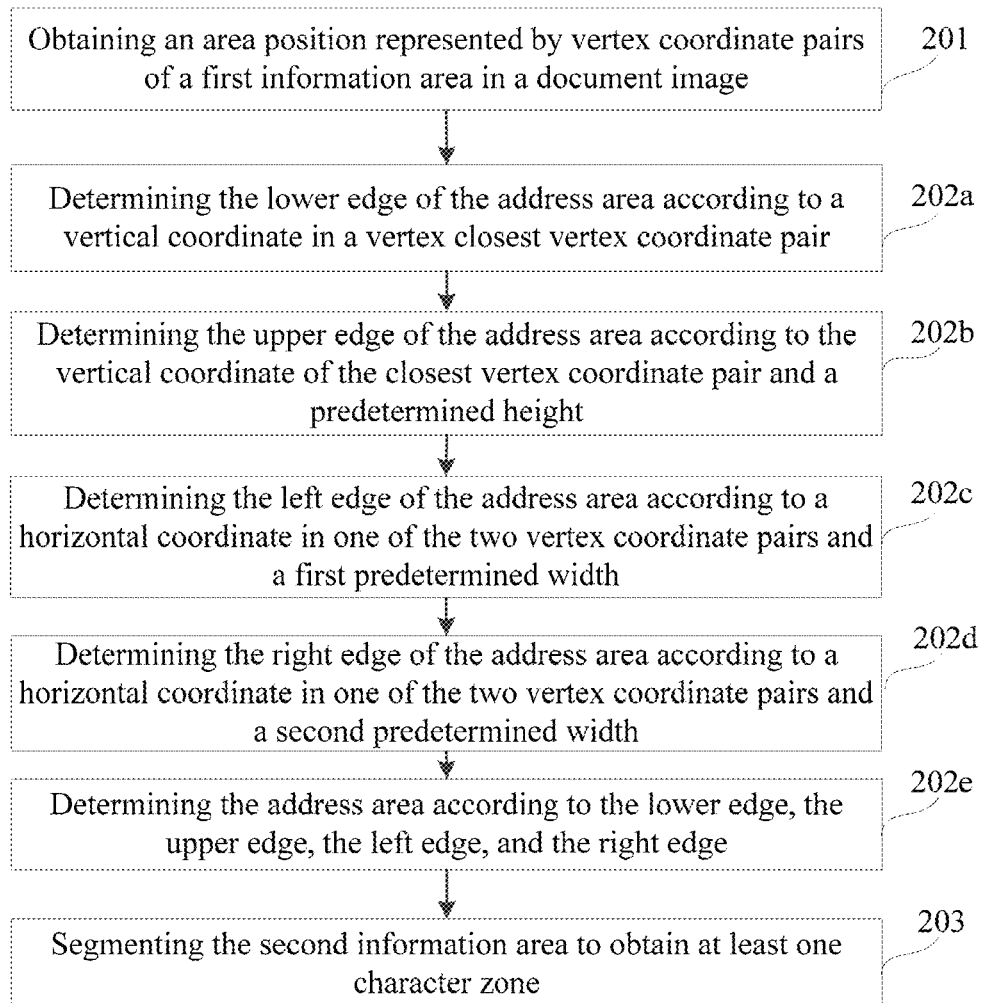
FIG. 2B is a flow chart showing a method for area extraction according to another exemplary embodiment.

FIG. 2B is a flow chart showing a method 200B for area extraction according to another exemplary embodiment. The exemplary method 200B is similar to the exemplary method 200A, except that, for illustration purpose, the exemplary method 200B specifically uses a second-generation Chinese ID card as an example of the document, uses an ID number area on the ID card as an example of the first information area, and uses an address area on the ID card as an example of the second information area. In this example, the vertex coordinate pairs of the upper left vertex and the upper right vertex of the ID number area are used to determine the address area.

Figure 2C:
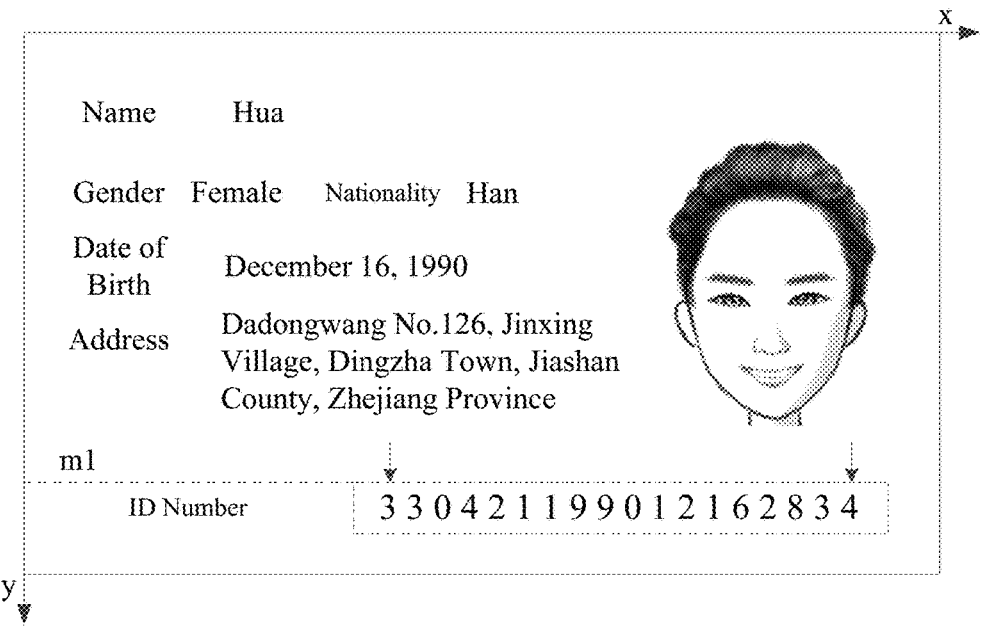
FIG. 2C is a schematic diagram showing the determination of a lower edge of an address area according to an exemplary embodiment.

As shown in FIG. 2B, at 202a, the lower edge of the address area is determined according to a vertical coordinate in a vertex coordinate pair of one of two vertexes that is closer to the address area. The vertex coordinate pair of the one of the two vertexes that is closer to the address area is also referred to as a "closest vertex coordinate pair." According to a predetermined relative position relationship between the ID number area and the address area, the address area is above the ID number area. According to the establishing manner of the Cartesian coordinate system described above, a higher vertex has a smaller vertical coordinate, and is closer to the address area. Thus, a horizontal line, in which the vertical coordinate of the higher vertex in the two vertex coordinate pairs is located, serves as the lower edge of the address information area. FIG. 2C schematically illustrates the ID card image and the determination of the lower edge of the address area. For purposes of facilitating understanding different areas on the ID card image, the text in the ID card image shown in FIG. 2C and FIGS. 2D-2G described below has been translated into English. As shown in FIG. 2C, the horizontal line in which the vertical coordinate of the first number "3" in the ID number area is used as the lower edge m1 of the address area.

Figure 2D:
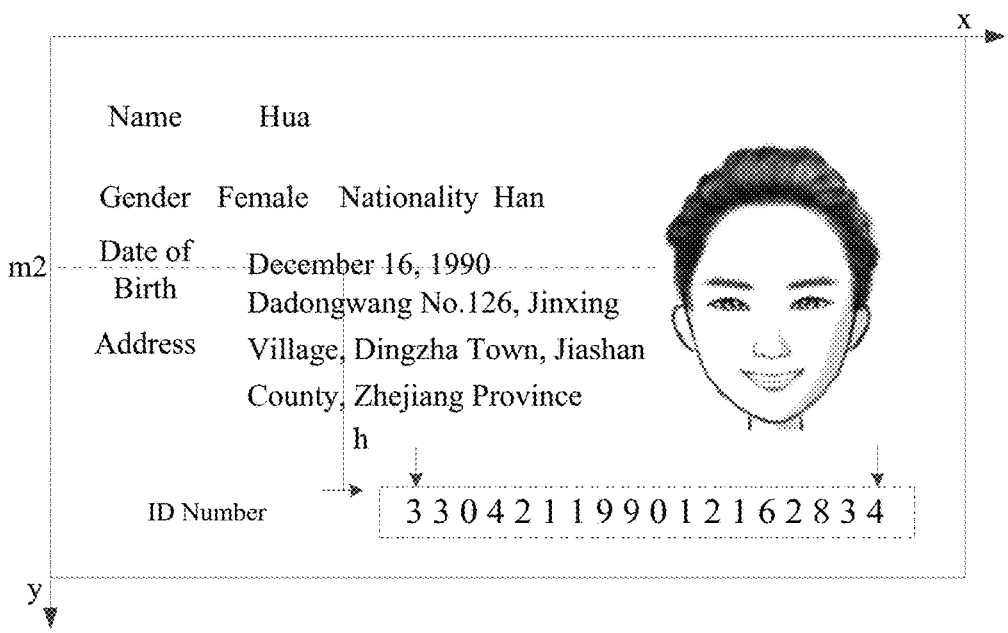
FIG. 2D is a schematic diagram showing the determination of an upper edge of the address area according to an exemplary embodiment.

At 202b, the upper edge of the address area is determined according to the vertical coordinate in the closest vertex coordinate pair and a predetermined height. Specifically, a horizontal line above the closest vertex coordinate pair and having a distance to the closest vertex coordinate pair equaling the predetermined height is determined as the upper edge of the address information area. The predetermined height does not need to be an exact height, as long as the predetermined height is large enough to cover the address area. FIG. 2D schematically illustrates the ID card image and the determination of the upper edge of the address area. As shown in FIG. 2D, the horizontal line above the first number "3" in the ID number area and having a distance to the first number "3" equaling the predetermined height h is determined as the upper edge m2 of the address area.

Figure 2E:
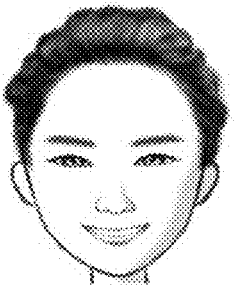
FIG. 2E is a schematic diagram showing the determination of a left edge of the address area according to an exemplary embodiment.

At 202c, the left edge of the address area is determined according to a horizontal coordinate in one of the two vertex coordinate pairs and a first predetermined width. Specifically, a vertical line on the left of the one of the two vertex coordinate pairs and having a distance to the one of the two vertex coordinate pairs equaling the first predetermined width is determined as the left edge of the address area. FIG. 2E schematically illustrates the ID card image and the determination of the left edge of the address area. As shown in FIG. 2E, the vertical line on the left of the first number "3" in the ID number area and having a distance to the first number "3" equaling the first predetermined width r×w is determined as the left edge m3 of the address area, where r represents a percentage and w represents the length of the ID number area. In some embodiments, the first predetermined width is different when a different vertex coordinate pair is used to determine the left edge of the address area.

Figure 2F:
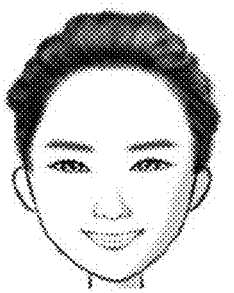
FIG. 2F is a schematic diagram showing the determination of a right edge of the address area according to an exemplary embodiment.

At 202d, the right edge of the address area is determined according to a horizontal coordinate in one of the two vertex coordinate pairs and a second predetermined width. Specifically, a vertical line having a distance to the one of the two vertex coordinate pairs equaling the second predetermined width is determined as the right edge of the address area. FIG. 2F schematically illustrates the ID card image and the determination of the right edge of the address area. As shown in FIG. 2F, the vertical line on the left of the last number "4" in the ID number area and having a distance to the last number "4" equaling the second predetermined width d is determined as the right edge m4 of the address area. In some embodiments, the second predetermined width is different when a different vertex coordinate pair is used to determine the right edge of the address area. The right edge of the address area can be on the left or on the right of the one of the two different vertex coordinate pairs, which is defined in the above-described relative position relationship. In some embodiments, the second predetermined width is a percentage of the length of the ID number region.

Figure 2G:
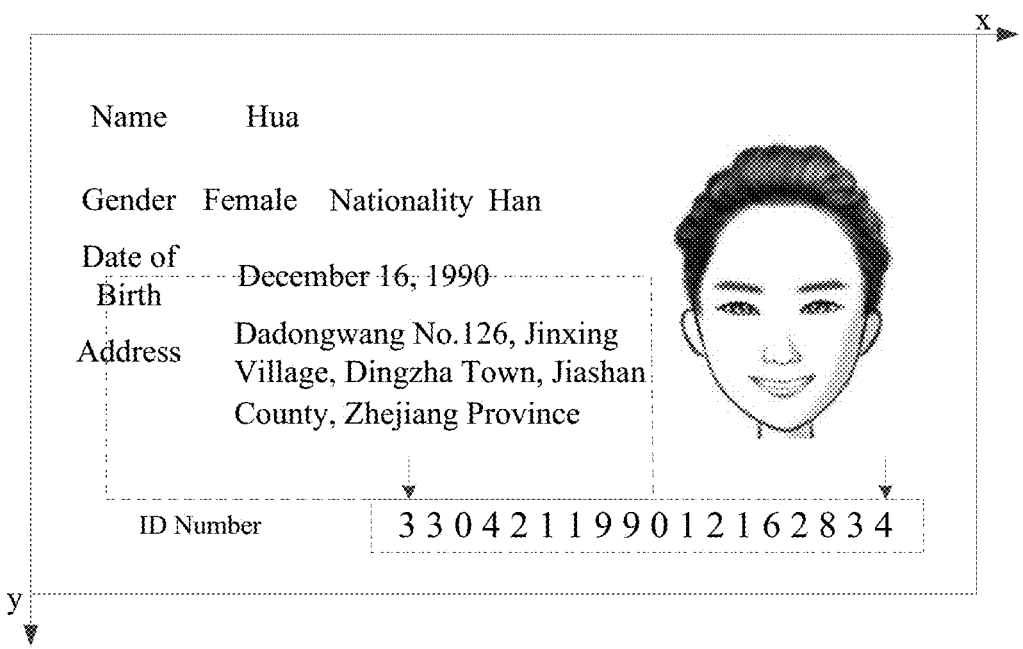
FIG. 2G is a schematic diagram showing the determination of the address area according to an exemplary embodiment.

At 202e, the address area is determined by the lower edge, the upper edge, the left edge, and the right edge. FIG. 2G schematically illustrates the ID card image and the determination of the address area.

As described above, the ID number area in the ID card image is used as the first information area. The format of the ID number area is relatively fixed and can be relatively easier to identify and extract. For example, Haar features or other features in the ID card image can be extracted and input into Adaboost or Support Vector Machine (SVM) for training to obtain a training model. The training model is used to recognize the ID number area in the ID image to determine the area position of the ID number region.

Figure 3A:
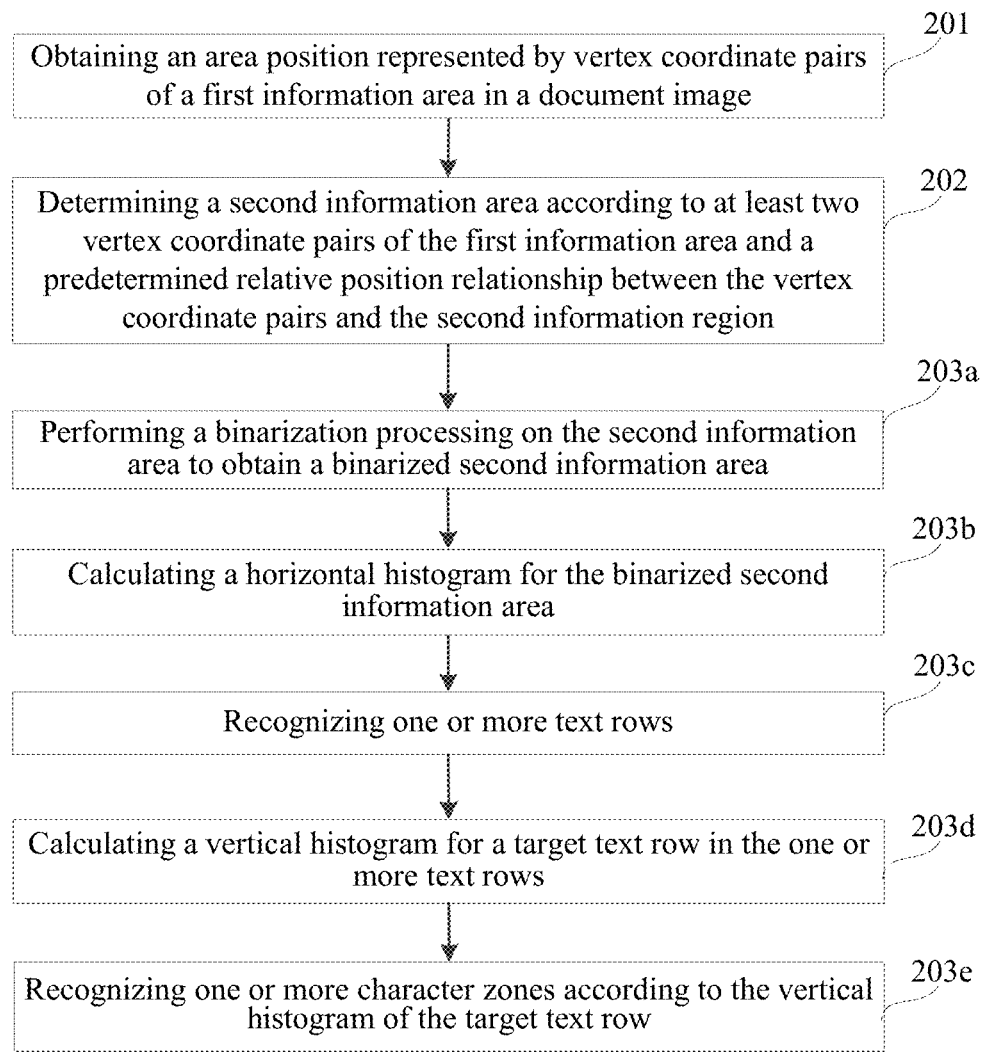
FIG. 3A is a flow chart showing a method for area extraction according to another exemplary embodiment.

FIG. 3A is a flow chart showing a method 300 for area extraction according to another exemplary embodiment. The exemplary method 300 is similar to the exemplary method 200A, except that the method 300 includes details of segmenting the second information area.

Figure 3B:
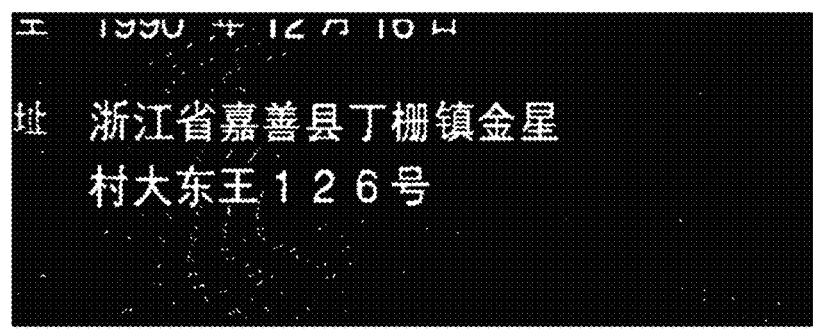
FIG. 3B is a schematic diagram showing the binarization of a second information area according to an exemplary embodiment.

As shown in FIG. 3A, at 203a, a binarization processing is performed on the second information area to obtain a binarized second information area. In some embodiments, a series of preprocessing is performed on the second information area, which may include operations such as denoising, filtering, edge extraction, and so on. Then the binarization processing is performed on the preprocessed second information area. During the binarization processing, gray values of pixels in the second information area are compared with a predetermined gray value threshold, the pixels in the second information area are divided into two groups—a group of pixels having a gray value larger than or equal to the predetermined gray value threshold and a group of pixels having a gray value smaller than the predetermined gray value threshold, and the two groups of pixels are rendered with black and white. In this way, the binarized second information area can be obtained. FIG. 3B shows an example of the binarized second information area. In the example shown in FIG. 3B and those shown in FIGS. 3C-3F, 4B, and 5B, the second information area includes an address area in a second-generation Chinese ID card. In FIGS. 3B-3F, 4B, and 5B, either the entire binarized address area or a portion of the binarized address area is shown. Moreover, in FIGS. 3B-3F, 4B, and 5B, for illustration purpose, the binarized image obtained by binarizing the address area containing Chinese characters in an actual second-generation Chinese ID card is shown, and the Chinese characters are shown in these drawings, rather than being translated into English. In FIG. 3B, the text is the address and means "Zhejiang Province Jiashan County Dingzha Town Jinxing Village Dadongwang No 0.126." According to the present disclosure, a white pixel in a binarized image, such as the binarized second information area shown in FIG. 3B, is located in the foreground and is referred to herein as a foreground color pixel. Similarly, a black pixel is located in the background and is referred to herein as a background color pixel.

Figure 3C:
FIG. 3C is a schematic diagram showing the calculation of a horizontal histogram at a horizontal direction according to an exemplary embodiment.

At 203b, a first histogram for the binarized second information area is calculated in a horizontal direction of the binarized second information area. The first histogram is also referred to herein as a "horizontal histogram." The vertical direction in the horizontal histogram represents vertical coordinates of the pixels in the binarized second information area, and the horizontal direction in the horizontal histogram represents the number of foreground color pixels in each row of pixels having the same vertical coordinate. FIG. 3C shows a portion of the binarized address area and the corresponding horizontal histogram. In FIG. 3C, the text is a part of the address and means "Zhejiang Province Jiashan County Dingzha Town Village Dadongwang No. 126."

At 203c, one or more rows of text region, also referred to herein as "text rows," are recognized according to the number of foreground color pixels in respective rows of pixels. Specifically, to recognize the one or more text rows, the number of foreground color pixels in each row of pixels is obtained according to the horizontal histogram and is compared with a first threshold, and then one or more consecutive row sets in the horizontal histogram are determined as the one or more text rows. Each of the one or more consecutive row sets includes consecutive rows each having the number of foreground color pixels larger than the first threshold.

Figure 3D:
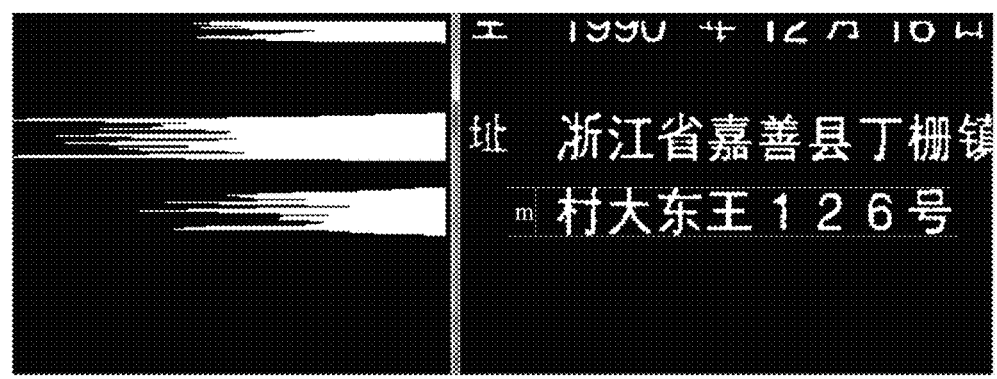
FIG. 3D is a schematic diagram showing a set of consecutive rows of pixels according to an exemplary embodiment.

FIG. 3D shows the recognition of a text row. The text in FIG. 3D is the same as the text in FIG. 3C. As shown in FIG. 3D, in each of m consecutive rows of pixels, the number of foreground color pixels is larger than the first threshold. This consecutive row set is recognized as a text row. The recognized text row in FIG. 3D includes text "村大东王 126 号," which is a part of the address and means "Village Dadongwang No. 126."

Figure 3E:
FIG. 3E is a schematic diagram showing the calculation of a vertical histogram at a vertical direction according to an exemplary embodiment.

At 203d, a second histogram for one of the one or more text rows, also referred to herein as a "target text row," is calculated in a vertical direction of the binarized second information area. The second histogram is also referred to herein as a "vertical histogram." The horizontal direction in the vertical histogram represents horizontal coordinates of the pixels in the target text row, and the vertical direction in the vertical histogram represents the number of foreground color pixels in each column of pixels having the same horizontal coordinate in the target text row. FIG. 3E shows an exemplary target text row and the corresponding vertical histogram. The text in FIG. 3E is a part of the address and means "Zhejiang Province Jiashan County Dingzha Town Jinxing."

At 203e, one or more character zones, each of which corresponds to a consecutive column set, are recognized according to the vertical histogram of the target text row. Each of the consecutive column sets includes consecutive columns of pixels, each of which has a number of foreground color pixels larger than a second threshold. Specifically, to recognize the one or more character zones, the number of foreground color pixels in each column of pixels is obtained according to the vertical histogram and is compared with the second threshold, and then one or more consecutive column sets in the vertical histogram are determined as the one or more character zones.

Figure 3F:
FIG. 3F is a schematic diagram showing a set of consecutive columns of pixels according to an exemplary embodiment.

FIG. 3F shows the recognition of a character zone. The text in FIG. 3F is the same as the text in FIG. 3E. As shown in FIG. 3F, in each of p consecutive columns of pixels, the number of foreground color pixels is larger than the second threshold. This consecutive column set is recognized as a character zone, which includes a Chinese character "浙".

In the exemplary method 300 described above with reference to FIG. 3A, when the second information area is being determined according to the area position of the first information area and the relative position relationship, errors may occur, i.e., text or noise that does not belong to the second information area are included into the second information area. Such text or noise can be discarded based on row spacings, as described below.

Figure 4A:
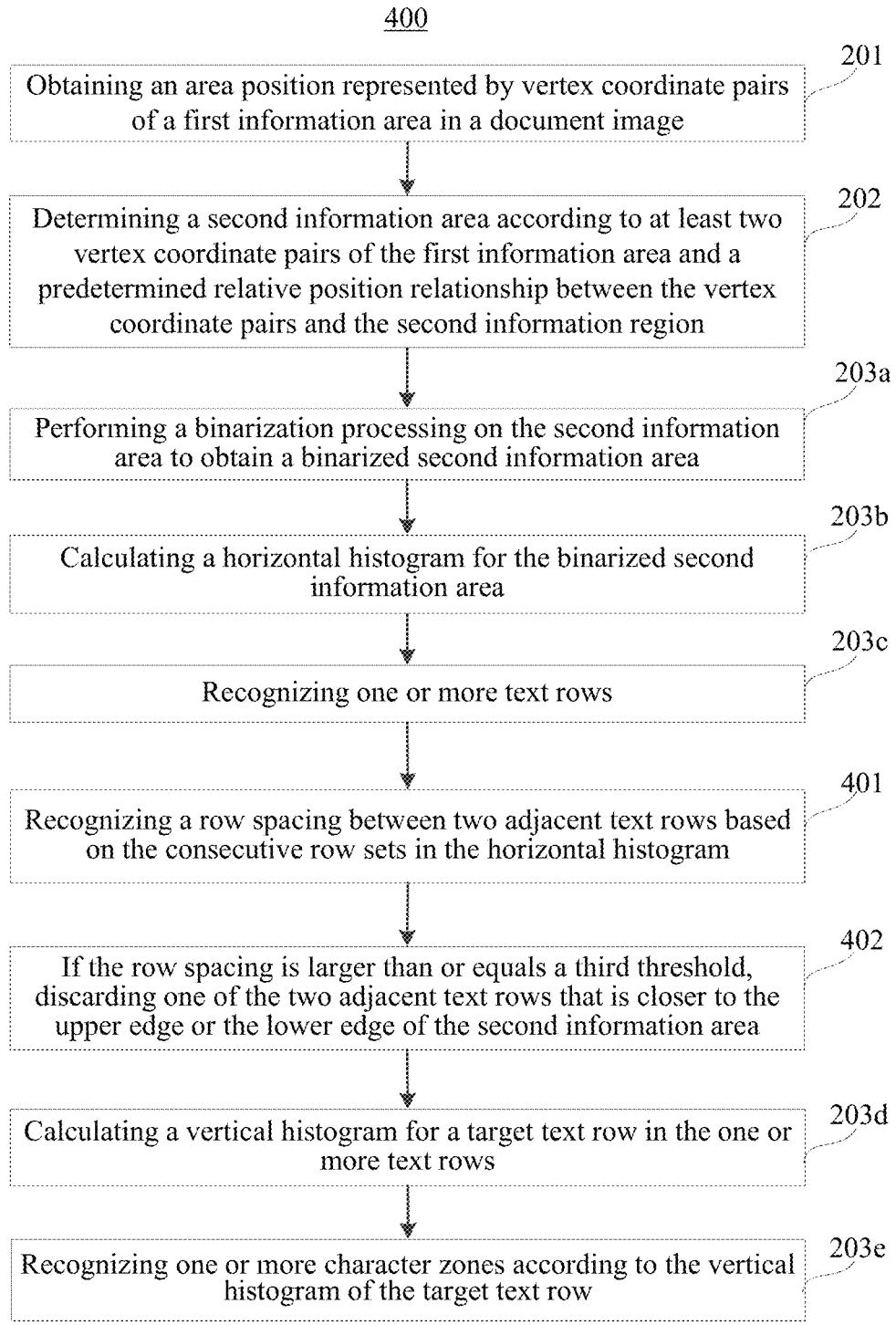
FIG. 4A is a flow chart showing a method for area extraction according to another exemplary embodiment.

FIG. 4A is a flow chart showing a method 400 for area extraction according to another exemplary embodiment. The exemplary method 400 is similar to the exemplary method 300, except that the method 400 includes additional processes for discarding text.

As shown in FIG. 4A, at 401, a row spacing between two adjacent text rows is recognized based on the consecutive row sets in the horizontal histogram. The row spacing refers to a distance between two text rows in the horizontal histogram. In the ID card image, the address area generally includes one to three text rows, such as shown in FIG. 3B. The one to three text rows in the address area usually have a relatively small row spacing between each other. Meanwhile, these text rows in the address area have a relatively large row spacing with other text regions outside the address area. Text regions that do not belong to the second information area are discarded based on the row spacing.

Figure 4B:
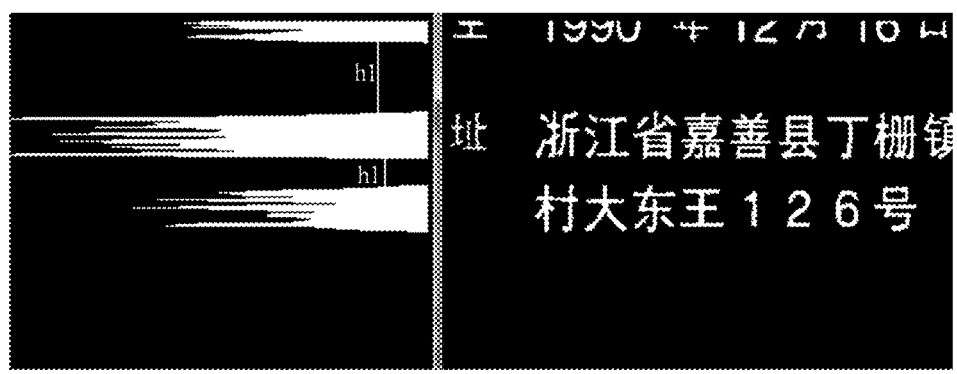
FIG. 4B is a schematic diagram showing a line spacing between two adjacent text rows according to an exemplary embodiment.

FIG. 4B shows the determination of row spacings. The text in FIG. 4B is the same as the text in FIG. 3C. In FIG. 4B, the row spacing between two adjacent text rows is determined as h1, which may be different for different pairs of adjacent text rows.

At 402, if the row spacing between the two adjacent text rows is larger than or equals a third threshold, one of the two adjacent text rows that is closer to either the upper edge or the lower edge of the second information area is discarded. A row spacing larger than or equal to the third threshold is also referred to herein as a "large row spacing" and a row spacing smaller than the third threshold is also referred to herein as a "small row spacing."

For example, based on the horizontal histogram, a search can be conducted in the second information area from bottom to top for row spacing between text rows. If the first row spacing being located is a large row spacing, the lower one of the two adjacent text rows corresponding to the first row spacing is discarded. The search continues upwards until a second large row spacing is located, at which time the upper one of the two adjacent text rows corresponding to the second large row spacing is discarded. The remaining one or more text rows are determined to belong to the second information area.

In another scenario, the first row spacing being located is a small row spacing, the two adjacent text rows corresponding to the first row spacing are determined to belong to the second information area. The search continues upwards until a large row spacing is found, at which time the upper one of the two adjacent text rows corresponding to the large row spacing is discarded. In some embodiments, if no large row spacing can be found during the search, the search continues upwards until the entire second information area has been searched.

Alternatively, in some embodiments, the search can be conducted in the second information area based on the horizontal histogram from top to bottom. If the first row spacing being located is a large row spacing, the upper one of the two adjacent text rows corresponding to the first row spacing is discarded. The search continues downwards until a second large row spacing is located, at which time the lower one of the two adjacent text rows corresponding to the second large row spacing is discarded. The remaining one or more text rows are determined to belong to the second information area.

In another scenario, the first row spacing being located is a small row spacing, the two adjacent text rows corresponding to the first row spacing are determined to belong to the second information area. The search continues downwards until a large row spacing is found, at which time the lower one of the two adjacent text rows corresponding to the large row spacing is discarded. In some embodiments, if no large row spacing can be found during the search, the search continues downwards until the entire second information area has been searched.

In the exemplary methods 300 and 400 described above with reference to FIGS. 3A and 4A, when the left and right edges of the second information area are being determined, errors may occur, i.e., a character zone that does not belong to the second information area is included into the second information area. Such a character zone can be discarded according to character spacings, as described below.

Figure 5A:
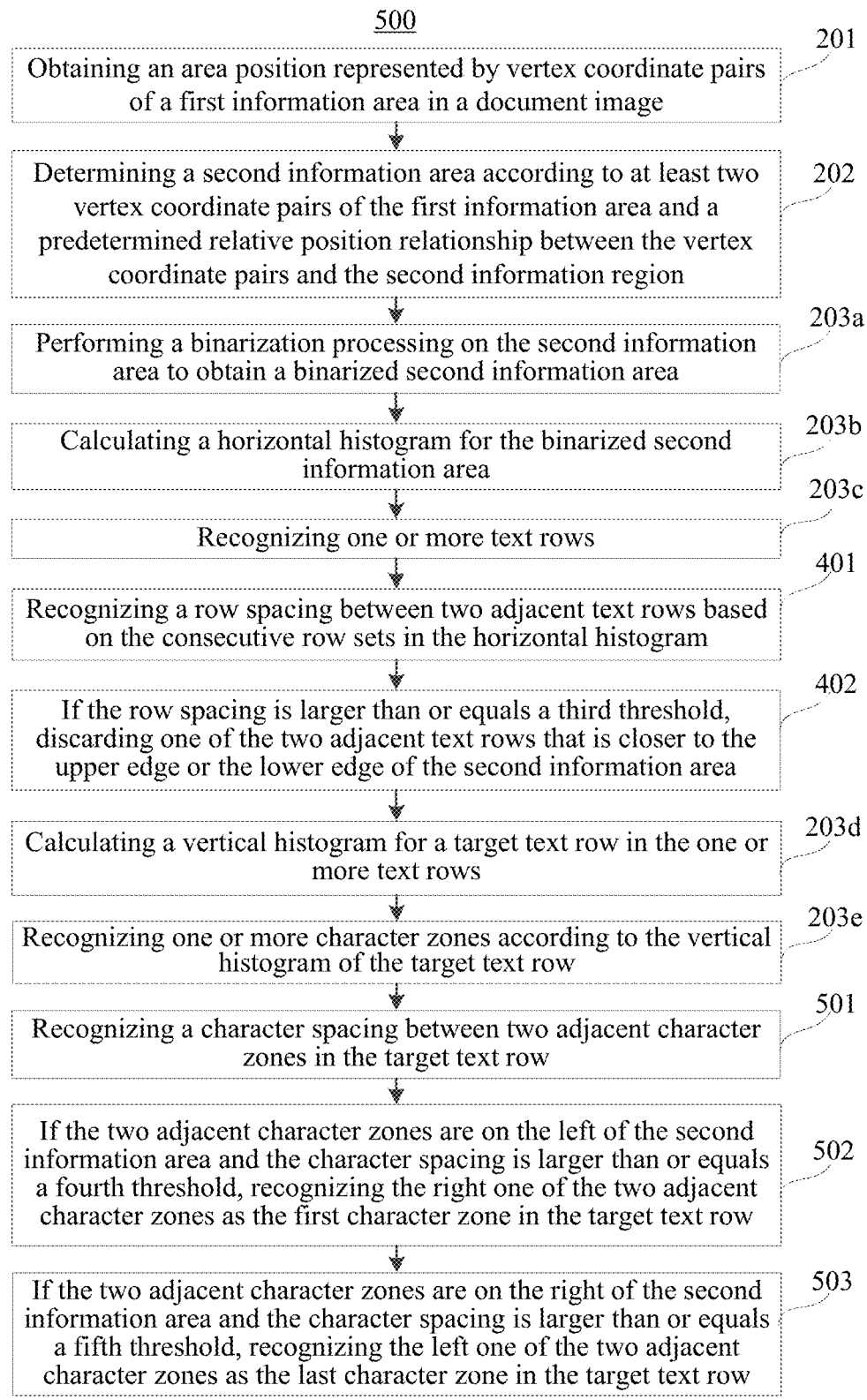
FIG. 5A is a flow chart showing a method for area extraction according to another exemplary embodiment.

FIG. 5A is a flow chart showing a method 500 for area extraction according to another exemplary embodiment. The exemplary method 500 is similar to the exemplary method 400, except that the method 500 includes additional processes for discarding character zones.

As shown in FIG. 5A, at 501, a character spacing between two adjacent character zones in the target text row is recognized based on the consecutive column sets in the vertical histogram. Each of the consecutive column sets includes columns each having a number of foreground color pixels larger than the second threshold.

Figure 5B:
FIG. 5B is a schematic diagram showing a character spacing between two adjacent character zones according to another exemplary embodiment.

Usually, the character spacing between two adjacent character zones in one text row is relatively small. For example, FIG. 5B shows the determination of character spacings. The text in FIG. 5B is the same as the text in FIG. 3E. In FIG. 5B, the character spacing between two adjacent character zones is determined as h2, which may be different for different pairs of adjacent character zones.

At 502, if the two adjacent character zones are on the left of the second information area and the character spacing is larger than or equals a fourth threshold, the right one of the two adjacent character zones is recognized as the first character zone in the target text row. A character spacing larger than or equal to the fourth threshold is also referred to herein as a "large left character spacing" and a character spacing smaller than the fourth threshold is also referred to herein as a "small left character spacing."

For example, a search can be conducted in the target text row starting from a character zone in the middle of the target text row, toward the left of the target text row, until a large left character spacing is found. The right one of two adjacent character zones corresponding to the large left character spacing is determined as the first character zone of the target text row. The left one of the two adjacent character zones, and other character zones on the left of the two adjacent character zones if available, i.e., all of the character zones on the left of the large left character spacing, are discarded.

In another scenario, the search reaches the left end of the target text row but no large left character spacing is found, then all the character zones that have been searched are determined to belong to the target text row.

At 503, if the two adjacent character zones are on the right of the second information area and the character spacing is larger than or equals a fifth threshold, the left one of the two adjacent character zones is recognized as the last character zone in the current text row. A character spacing larger than or equal fifth threshold is also referred to herein as a "large right character spacing" and a character spacing smaller than the fifth threshold is also referred to herein as a "small right character spacing."

For example, a search can be conducted in the target text row starting from a character zone in the middle of the target text row, toward the right of the target text row, until a large right character spacing is found. The left one of two adjacent character zones corresponding to the large right character spacing is determined as the last character zone of the target text row. The right one of the two adjacent character zones, and other character zones on the right of the two adjacent character zones if available, i.e., all of the character zones on the right of the large right character spacing, are discarded.

In another scenario, the search reaches the right end of the target text row but no large right character spacing is found, then all the character zones that have been searched are determined to belong to the target text row.

In some embodiments, when character zones are recognized, characters of the character zones can be recognized by performing further processing, according to existing character recognition algorithms, on the character zones.

The ID card image shown and described above is merely for illustrative purposes, which is not a real ID card image.

Exemplary devices are described below, which are configured to perform a method consistent with the disclosure, such as one of the above-described exemplary methods. Operations of the exemplary devices are similar to the exemplary methods described above, and thus their detailed description is omitted here.

Figure 6:
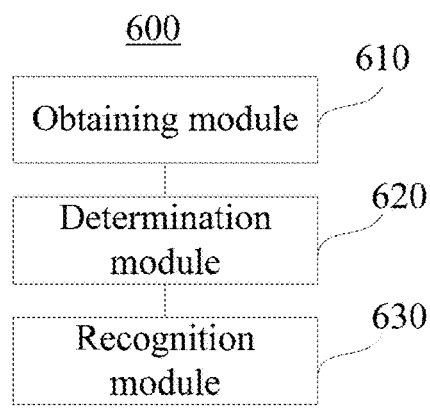
FIG. 6 is a block diagram showing a device for area extraction according to an exemplary embodiment.

FIG. 6 is a block diagram illustrating a device 600 for area extraction according to an exemplary embodiment. As shown in FIG. 6, the device 600 includes, but is not limited to an obtaining module 610, a determination module 620, and a recognition module 630.

The obtaining module 610 is configured to obtain an area position of a first information area in a document image. The document image refers to an image obtained directly by photographing a document, and can be, for example, an image of an ID card, an image of a social security card, or the like. An information area refers to an area that contains characters, such as at least one of a name area, a data of birth area, a gender area, an address area, an ID number information area, a serial number area, an issuing office area, an expiration date area, or the like.

The determination module 620 is configured to determine a second information area according to the area position of the first information area.

The recognition module 630 is configured to segment the second information area to obtain at least one character zone. The character zone is an image zone including a single character.

Figure 7:
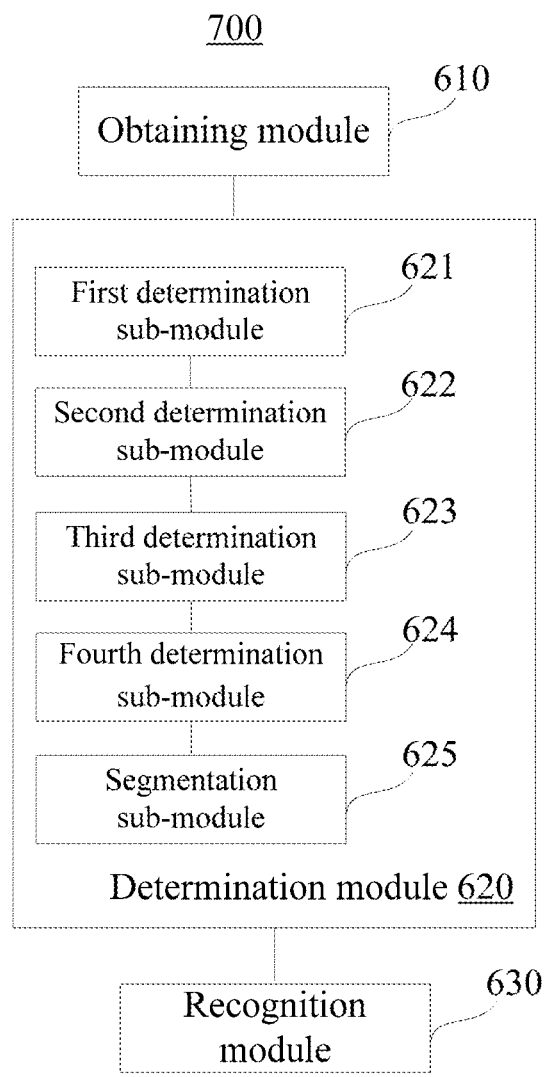
FIG. 7 is a block diagram showing a device for area extraction according to another exemplary embodiment.

FIG. 7 is a block diagram illustrating a device 700 for area extraction according to another exemplary embodiment. As shown in FIG. 7, the device 700 includes the obtaining module 610, the determination module 620, and the recognition module 630.

In some embodiments, the obtaining module 610 obtains vertex coordinate pairs of respective vertexes in the first information area based on the region position of the first information area. Thus, the region position can be represented by the vertex coordinate pairs. The recognition module 620 then determines the second information area according to two vertex coordinate pairs of the first information area and a predetermined relative position relationship between vertex coordinate pairs and the second information area.

In some embodiments, the determination module 620 includes a first determination sub-module 621, a second determination sub-module 622, a third determination sub-module 623, a fourth determination sub-module 624, and a segmentation sub-module 625. In this and other examples described below, an ID card image is used as an example of the document image, and the first and second information areas include the ID number area and the address area, respectively.

The first determination sub-module 621 is configured to determine a lower edge of the address area according to a vertical coordinate in a closest vertex coordinate pair, i.e., the vertex coordinate pair of one of two vertexes that is closer to the address area.

The second determination sub-module 622 is configured to determine an upper edge of the address area according to the vertical coordinate of the closest vertex coordinate pair and a predetermined height.

The third determination sub-module 623 is configured to determine a left edge of the address area according to a horizontal coordinate in one of the two vertex coordinate pairs and a first predetermined width.

The fourth determination sub-module 624 is configured to determine a right edge of the address area according to a horizontal coordinate in one of the two vertex coordinate pairs and a second predetermined width.

The segmentation sub-module 625 is configured to determine the address area according to the lower edge, the upper edge, the left edge, and the right edge.

Figure 8:
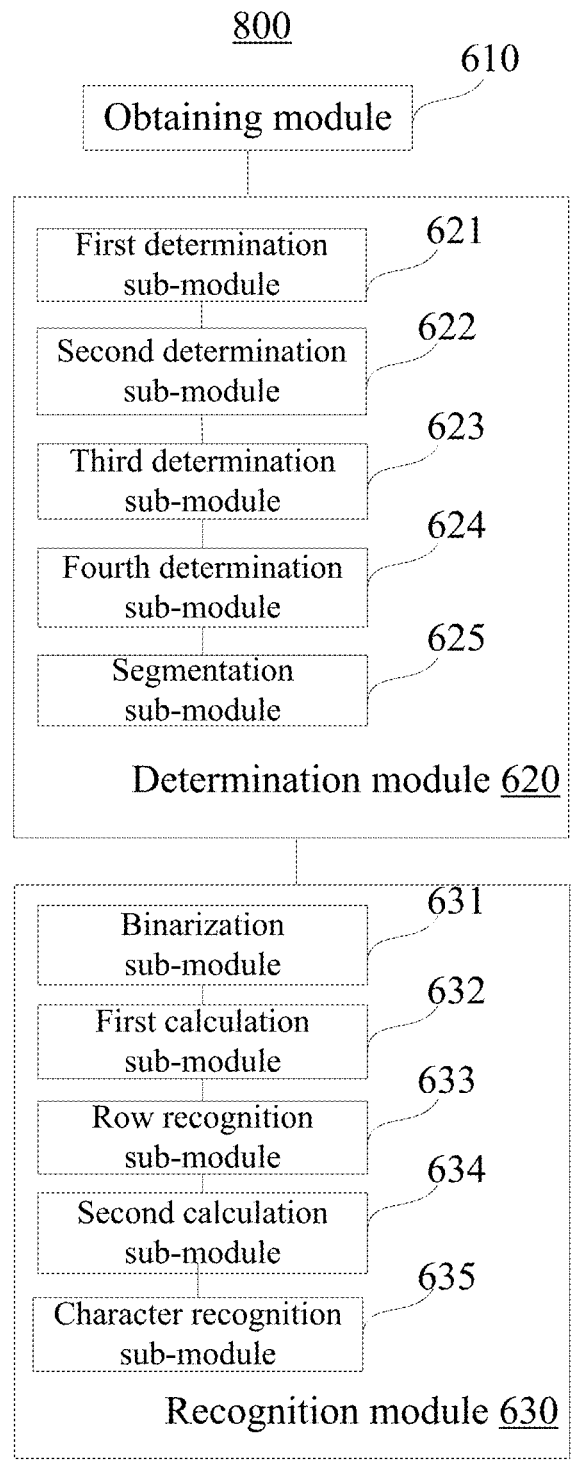
FIG. 8 is a block diagram showing a device for area extraction according to another exemplary embodiment.

FIG. 8 is a block diagram illustrating a device 800 for area extraction according to another exemplary embodiment. As shown in FIG. 8, the device 800 includes the obtaining module 610, the determination module 620 which includes the first determination sub-module 621, the second determination sub-module 622, the third determination sub-module 623, the fourth determination sub-module 624, and the segmentation sub-module 625, and the recognition module 630. Further, the recognition module 630 includes a binarization sub-module 631, a first calculation sub-module 632, a row recognition sub-module 633, a second calculation sub-module 634, and a character recognition sub-module 635.

The binarization sub-module 631 is configured to perform a binarization processing on the second information area to obtain a binarized second information area.

The first calculation sub-module 632 is configured to calculate a horizontal histogram of the binarized second information area in a horizontal direction of the binarized second information area.

The row recognition sub-module 633 is configured to recognize one or more text rows based on one or more consecutive row sets in the horizontal histogram. Each of the one or more consecutive row sets includes consecutive rows each having a number of foreground color pixels larger than a first threshold.

The second calculation sub-module 634 is configured to calculate a vertical histogram for a target text row in a vertical direction of the binarized second information area.

The character recognition sub-module 635 is configured to recognize one or more character zones based on consecutive column sets in the vertical histogram of the target text row. Each of the consecutive column sets includes consecutive columns each having a number of foreground color pixels larger than a second threshold.

Figure 9:
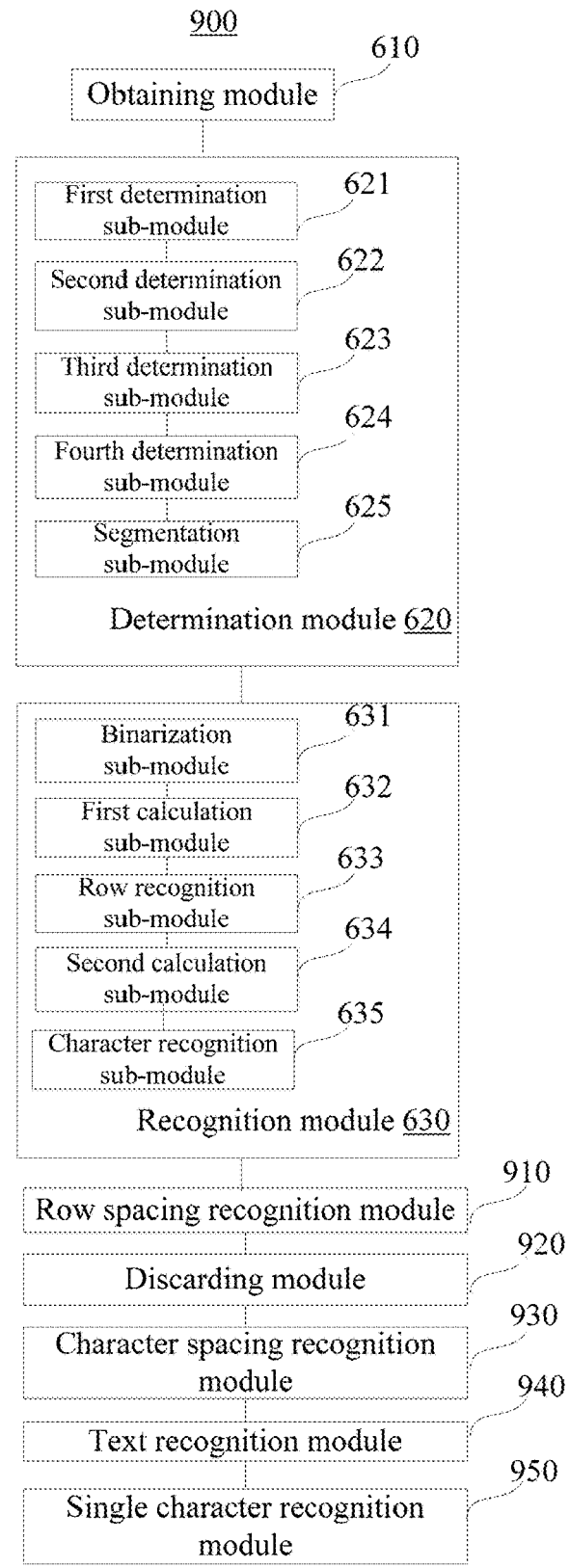
FIG. 9 is a block diagram showing a device for area extraction according to another exemplary embodiment.

FIG. 9 is a block diagram illustrating a device 900 for area extraction according to another exemplary embodiment. The device 900 is similar to the device 800, except that the device 900 further includes a row spacing recognition module 910, a discarding module 920, a character spacing recognition module 930, a text recognition module 940, and a single character recognition module 950.

The row spacing recognition module 910 is configured to recognize a row spacing between two adjacent text rows based on the consecutive row sets in the horizontal histogram.

The discarding module 920 is configured to discard one of the two text rows that is closer to an edge of the second information area if the row spacing is larger than a third threshold. The edge is the upper edge or lower edge of the second information area.

The character spacing recognition module 930 is configured to recognize a character spacing between two adjacent character zones in the target text row based on the consecutive column sets in the vertical histogram.

The text recognition module 940 is configured to recognize the right one of the two adjacent character zones as the first character zone in the target text row if the two adjacent character zones are on the left of the second information area and the character spacing is larger than or equals a fourth threshold.

The single character recognition module 950 is configured to recognize the left one of the two adjacent character zones as the last character zone in the target text row if the two adjacent character zones are on the right of the second information area and the character spacing is larger than or equals a fifth threshold.

In an exemplary embodiment of the disclosure, a device for area extraction is provided, which includes a processor and a memory storing processor-executable instructions, wherein the processor is configured to perform a method for area extraction consistent with the present disclosure, such as one of the above-described exemplary methods.

Figure 10:
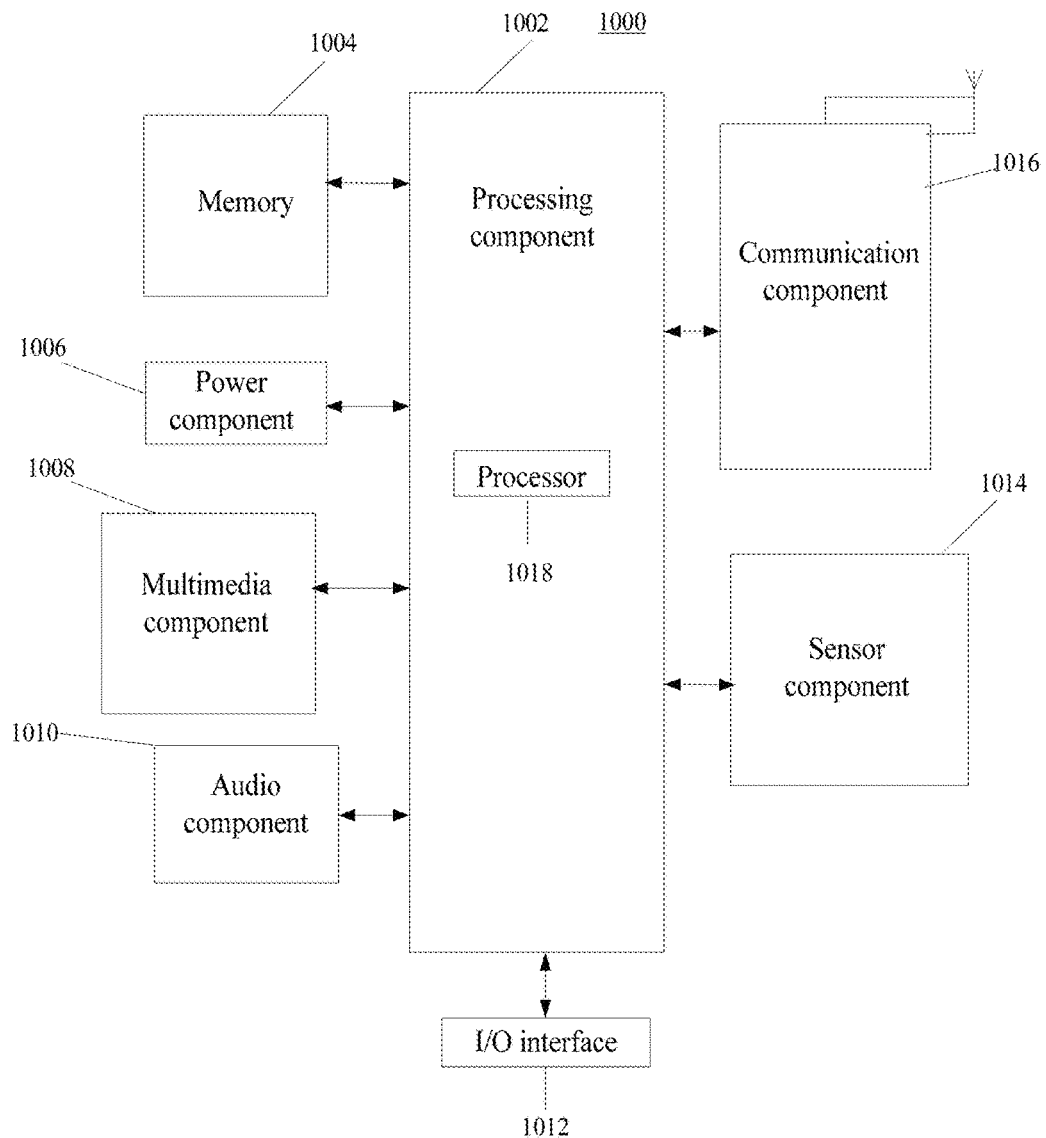
FIG. 10 is a block diagram showing a device for area extraction according to another exemplary embodiment.

FIG. 10 is a block diagram of a device 1000 for area extraction according to another exemplary embodiment. For example, the device 1000 may be a mobile phone, a computer, a digital broadcast terminal, a messaging device, a gaming console, a tablet, a medical device, exercise equipment, a personal digital assistant, or the like.

Referring to FIG. 10, the device 1000 includes one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1018 to execute instructions to perform all or part of a method consistent with the present disclosure, such as one of the above-described exemplary methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power for the device 1000.

The multimedia component 1008 includes a screen providing an output interface between the device 1000 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the device 1000 is in an operation mode, such as a photographing mode or a video mode. Each of the front camera and the rear camera may be a fixed optical lens system or have optical focusing and zooming capability.

The audio component 1010 is configured to output and/or input audio signals. For example, the audio component 1010 includes a microphone configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, the peripheral interface modules being, for example, a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components (e.g., the display and the keypad, of the device 1000), a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of a nearby object without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as WiFi, 3Q or 4Q or a combination thereof. In an exemplary embodiment, the communication component 1016 receives a broadcast signal or broadcast associated information from an external broadcast management system via a broadcast channel. In an exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, or another technology.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above-described exemplary methods.

In exemplary embodiments, there is also provided a non-transitory computer-readable storage medium including instructions, such as included in the memory 1004, executable by the processor 1018 in the device 1000, for performing a method consistent with the present disclosure, such as one of the above-described exemplary methods. For example, the non-transitory computer-readable storage medium may be a ROM, a RAM, a CD-ROM, a magnetic tape, a floppy disc, an optical data storage device, or the like.

According to the present disclosure, the position of a first information area can be used to determine the position of a second information area which is more difficult to locate than the first information area. Further, whether certain text belongs to the second information area can be determined according to row spacings between text rows and character spacings between character zones. As such, the second information area can be more precisely located and character zones in the second information area can be more precisely recognized.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for area extraction, comprising:
    obtaining an area position of a first information area in a document image;
    determining a second information area according to the area position of the first information area; and
    segmenting the second information area to obtain at least one character zone,
    wherein segmenting the second information area comprises:
        performing a binarization processing on the second information area to obtain a binarized second information area;
        calculating a horizontal histogram of the binarized second information area in a horizontal direction, a vertical direction in the horizontal histogram representing vertical coordinates of pixels in the binarized second information area, and a horizontal direction in the horizontal histogram representing a number of foreground color pixels in each row of pixels;
        recognizing one or more text rows based on consecutive row sets in the horizontal histogram, each of the consecutive row sets including consecutive rows each having the number of foreground color pixels larger than a first threshold;
        calculating a vertical histogram for a target text row in the one or more text rows in a vertical direction, a horizontal direction in the vertical histogram representing horizontal coordinates of the pixels in the target text row, and a vertical direction in the vertical histogram representing the number of foreground color pixels in each column of pixels; and
        recognizing the at least one character zone based on consecutive column sets in the vertical histogram, each of the consecutive column sets including consecutive columns each having the number of foreground color pixels larger than a second threshold, and
    wherein the method further comprises:
        recognizing a row spacing between two adjacent text rows based on the consecutive row sets in the horizontal histogram; and
        discarding, if the row spacing is larger than a third threshold, one of the two adjacent text rows that is closer to an upper edge or a lower edge of the second information area.

2. The method of claim 1, wherein:
    obtaining the area position includes:
        obtaining two vertex coordinate pairs representing the area position, and determining the second information area includes:
        determining the second information area according to the two vertex coordinate pairs and a predetermined relative position relationship between the two vertex coordinate pairs and the second information area.

3. The method of claim 2, wherein determining the second information area according to the two vertex coordinate pairs and the predetermined relative position relationship includes:

determining a lower edge of the second information area according to a vertical coordinate in a closer vertex coordinate pair of the two vertex coordinate pairs that is closer to the second information area;

determining an upper edge of the second information area according to the vertical coordinate in the closer vertex coordinate pair and a predetermined height;

determining a left edge of the second information area according to a horizontal coordinate of any one of the two vertex coordinate pairs and a first predetermined width;

determining a right edge of the second information area according to a horizontal coordinate of any one of the two vertex coordinate pairs and a second predetermined width; and determining the second information area according to the lower edge, the upper edge, the left edge, and the right edge.

4. The method of claim 1, further comprising:

recognizing a character spacing between two adjacent character zones based on the consecutive column sets in the vertical histogram;

recognizing, if the two adjacent character zones are on the left of the second information area and the character spacing is larger than a fourth threshold, a right one of the two adjacent character zones as a first character zone in the target text row; and recognizing, if the two adjacent character zones are on the right of the second information area and the character spacing is larger than a fifth threshold, a left one of the two adjacent character zones as a last character zone in the target text row.

5. A device for area extraction, comprising:

a processor; and a memory storing instructions that, when executed by the processor, cause the processor to:

obtain an area position of a first information area in a document image;

determine a second information area according to the area position of the first information area; and segment the second information area to obtain at least one character zone, wherein in segmenting the second information area to obtain at least one character zone, the instructions further cause the processor to:

perform a binarization processing on the second information area to obtain a binarized second information area;

calculate a horizontal histogram of the binarized second information area in a horizontal direction, a vertical direction in the horizontal histogram representing vertical coordinates of pixels in the binarized second information area, and a horizontal direction in the horizontal histogram representing a number of foreground color pixels in each row of pixels;

recognize one or more text rows based on consecutive row sets in the horizontal histogram, each of the consecutive row sets including consecutive rows each having the number of foreground color pixels larger than a first threshold;

calculate a vertical histogram for a target text row in the one or more text rows in a vertical direction, a horizontal direction in the vertical histogram representing horizontal coordinates of the pixels in the target text row, and a vertical direction in the vertical histogram representing the number of foreground color pixels in each column of pixels; and recognize the at least one character zone based on consecutive column sets in the vertical histogram, each of the consecutive column sets including consecutive columns each having the number of foreground color pixels larger than a second threshold, and wherein the instructions further cause the processor to:

recognize a row spacing between two adjacent text rows based on the consecutive row sets in the horizontal histogram; and discard, if the row spacing is larger than a third threshold, one of the two adjacent text rows that is closer to an upper edge or a lower edge of the second information area.

6. The device of claim 5, wherein the instructions further cause the processor to:

obtain two vertex coordinate pairs representing the area position; and determine the second information area according to the two vertex coordinate pairs and a predetermined relative position relationship between the two vertex coordinate pairs and the second information area.

7. The device of claim 6, wherein the instructions further cause the processor to:

determine a lower edge of the second information area according to a vertical coordinate in a closer vertex coordinate pair of the two vertex coordinate pairs that is closer to the second information area;

determine an upper edge of the second information area according to the vertical coordinate in the closer vertex coordinate pair and a predetermined height;

determine a left edge of the second information area according to a horizontal coordinate of any one of the two vertex coordinate pairs and a first predetermined width;

determine a right edge of the second information area according to a horizontal coordinate of any one of the two vertex coordinate pairs and a second predetermined width; and determine the second information area according to the lower edge, the upper edge, the left edge, and the right edge.

8. The device of claim 5, wherein the instructions further cause the processor to:

recognize a character spacing between two adjacent character zones based on the consecutive column sets in the vertical histogram;

recognize, if the two adjacent character zones are on the left of the second information area and the character spacing is larger than a fourth threshold, a right one of the two adjacent character zones as a first character zone in the target text row; and recognize, if the two adjacent character zones are on the right of the second information area and the character spacing is larger than a fifth threshold, a left one of the two adjacent character zones as a last character zone in the target text row.

9. A non-transitory computer-readable storage medium having stored therein instructions that, when executed by a processor, cause the processor to:

obtain an area position of a first information area in a document image;

determine a second information area according to the area position of the first information area; and segment the second information area to obtain at least one character zone, wherein in segmenting the second information area to obtain at least one character zone, the instructions further cause the processor to:
  perform a binarization processing on the second information area to obtain a binarized second information area;
  calculate a horizontal histogram of the binarized second information area in a horizontal direction, a vertical direction in the horizontal histogram representing vertical coordinates of pixels in the binarized second information area, and a horizontal direction in the horizontal histogram representing a number of foreground color pixels in each row of pixels;
  recognize one or more text rows based on consecutive row sets in the horizontal histogram, each of the consecutive row sets including consecutive rows each having the number of foreground color pixels larger than a first threshold;
  calculate a vertical histogram for a target text row in the one or more text rows in a vertical direction, a horizontal direction in the vertical histogram representing horizontal coordinates of the pixels in the target text row, and a vertical direction in the vertical histogram representing the number of foreground color pixels in each column of pixels; and
  recognize the at least one character zone based on consecutive column sets in the vertical histogram, each of the consecutive column sets including consecutive columns each having the number of foreground color pixels larger than a second threshold, and
wherein the instructions further cause the processor to:
  recognize a row spacing between two adjacent text rows based on the consecutive row sets in the horizontal histogram; and
  discard, if the row spacing is larger than a third threshold, one of the two adjacent text rows that is closer to an upper edge or a lower edge of the second information area.

* * * * *